T. E. GILL.
FILE.
APPLICATION FILED FEB. 11, 1909.

944,730.

Patented Dec. 28, 1909.

Witnesses;
Ruth W. Miller
Mary A. Cavanaugh

Inventor;
Thomas E. Gill,
By Harry Trease,
Attorney.

UNITED STATES PATENT OFFICE.

THOMAS E. GILL, OF CANTON, OHIO.

FILE.

944,730.

Specification of Letters Patent.  Patented Dec. 28, 1909.

Application filed February 11, 1909. Serial No. 477,371.

*To all whom it may concern:*

Be it known that I, THOMAS E. GILL, a citizen of the United States, residing at Canton, in the county of Stark and State of Ohio, have invented a new and useful Improvement in Files, of which the following is a specification.

The invention relates to the manner of shaping and arranging the teeth of a file, and also pertains to an adjustable handle for the same; and in the first case the object of the improvement is to arrange the teeth not only to obtain a greater efficiency in cutting, but also in freeing the filings from the teeth, and in the second case the purpose of the improvement is to provide a pair of adjustable handles on the side of the file so that the same can be positively operated with two hands.

The primary objects of the invention, thus set forth in general terms, are attained—in a preferred embodiment of the same illustrated in the accompanying drawings, forming part of this specification, in which—

Figure 3:
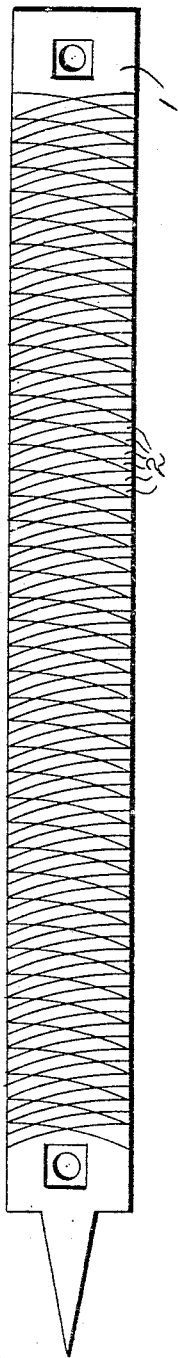
Figure 1:
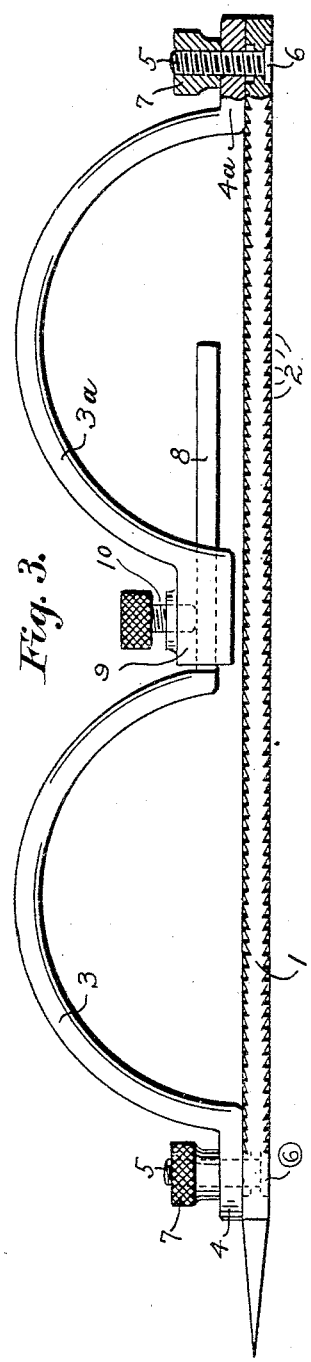
Figure 2:
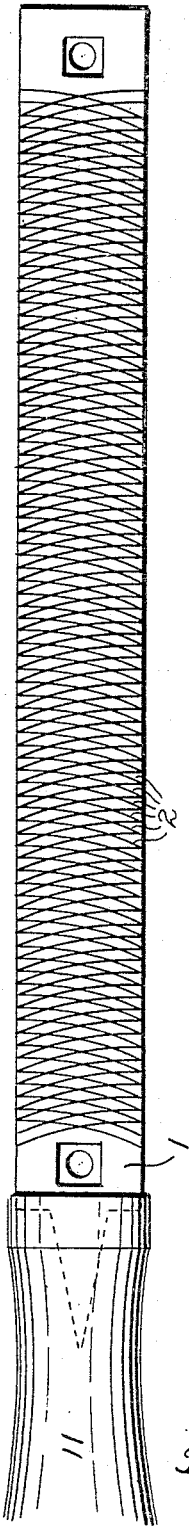

Figure 1 is a plan view of the file with part of an ordinary handle on one end thereof and showing the improved manner of arranging the teeth thereon; Fig. 2, a plan view of the file without a handle, which may be the reverse side of Fig. 1, and showing a modified arrangement of the teeth thereon; and Fig. 3, a side elevation of the file showing the improved pair of handles on the side thereof.

Similar numerals refer to similar parts throughout the drawings.

The file 1 employed to illustrate the invention is preferably of the type known as a flat file and on its respective sides are provided the series of teeth 2, the forward cutting edges of which are designated in the drawings by single curved lines. Each tooth is arranged to start substantially at right angles to one side edge of the file and is thence curved rearwardly toward the other side edge with the convex side of the curve directed toward the forward end of the file.

A preferred form of arranging the teeth on the file is shown in Fig. 1 in which two series of equally spaced teeth are provided which are arranged to cross each other in a symmetrical manner on the side of the file. A modified arrangement of the teeth is shown in Fig. 2 in which one series of teeth are spaced farther apart than the other series thus making a coarser form of file. But in all cases the teeth are curved toward the rearward end of the file from one side edge thereof with the convex side of the curve directed toward the forward end of the file. It is quite evident that by arranging the teeth in this manner, all the teeth will serve to deflect the filings outwardly on each side of the middle line of the file, and that on each side when the teeth of one series become more nearly perpendicular to the side edge of the file the corresponding ends of the other series attain their greatest inclination thereto, in both cases the teeth presenting the convex sides of their curves toward the forward end of the file; wherefore there is no tendency for the filings to be deflected and accumulated toward the middle portion of the file.

The adjustable handle for the side of the file is composed of the two similar members 3 and 3$^a$, which are preferably curved in a suitable manner to be conveniently grasped by the hands. The outer ends 4 and 4$^a$ of the handles are preferably flanged and are secured to the respective ends of the file, as by means of the bolts 5 the heads 6 of which are countersunk in the exposed side of the file, and the nuts 7 which are preferably adapted to be manipulated by the fingers. The inner ends of the handles are connected by an extensible joint, and as shown this joint is made up of the elongated slide 8 formed or attached on one section of the handle, and the elongated guide 9 formed or attached on the other section, in which guide the slide is adapted to be adjusted endwise, and the joint is secured in a particular position by means of the thumb screw 10.

It will be understood that it is not intended to limit the scope of the invention to the specific form and details of the handle which is employed to illustrate the described embodiment of the improvement; and it will also be understood that the ordinary handle 11 may be used on the file without affecting the feature of the invention which relates to the arrangement of the teeth thereon.

What I claim as my invention, and desire to secure by Letters Patent, is—

A file provided with mutually crossing series of teeth having their cutting edges curved rearwardly from the respective edges of the file toward the opposite edges, and convexed toward the forward end of the file.

THOMAS E. GILL.

Witnesses:
JOSEPH FREASE,
RUTH A. MILLER.